US 8,208,408 B2

(12) United States Patent
Du et al.

(10) Patent No.: US 8,208,408 B2
(45) Date of Patent: Jun. 26, 2012

(54) TREE-BASED NODE INSERTION METHOD AND MEMORY DEVICE

(75) Inventors: Wenhua Du, Shenzhen (CN); Rongfeng Hong, Shenzhen (CN); Yi Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 12/732,693

(22) Filed: Mar. 26, 2010

(65) Prior Publication Data

US 2010/0246446 A1  Sep. 30, 2010

(30) Foreign Application Priority Data

Mar. 30, 2009  (CN) .......................... 2009 1 0132653

(51) Int. Cl.
*H04L 12/28* (2006.01)
(52) U.S. Cl. .................. 370/256; 370/392; 707/797
(58) Field of Classification Search .................. 370/256, 370/389; 707/769, 797
See application file for complete search history.

(56) References Cited

U.S. PATENT DOCUMENTS

| | | | | |
|---|---|---|---|---|
| 6,625,611 | B1 * | 9/2003 | Teig et al. ............. | 707/999.102 |
| 7,349,415 | B2 | 3/2008 | Rangarajan et al. | |
| 7,657,556 | B2 * | 2/2010 | Bailey .................. | 707/999.102 |
| 7,831,626 | B1 * | 11/2010 | Depelteau ................ | 707/797 |
| 2004/0133590 | A1 * | 7/2004 | Henderson et al. .......... | 707/102 |
| 2004/0210588 | A1 * | 10/2004 | Simkins et al. ............. | 707/100 |
| 2005/0071336 | A1 * | 3/2005 | Najork et al. .................... | 707/8 |
| 2008/0071809 | A1 * | 3/2008 | Lomet .......................... | 707/100 |
| 2008/0104102 | A1 * | 5/2008 | Zhang ........................... | 707/102 |
| 2010/0146003 | A1 * | 6/2010 | Bruso et al. .................. | 707/797 |

OTHER PUBLICATIONS

Extended European Search Report includes, pursuant to Rule 62 EPC, the European Search Report (R. 61 EPC) or the partial European search report/declaration of no search (R. 63 EPC) and the European search opinion for Application No. 10003291.1, mailed Jun. 23, 2010, Huawei Technologies C., LTD (6 pages).
Richard F. Gilberg et al., Multiway Trees "10", XP-002585678, Data Structures: A Pseudocode Approach with C. Chapter 10, May 31, 2006, Thomas Course Technology, (pp. 423-479).
Haibin Lu et al, A B-Tree Dynamic Router-Table Design, IEEE Transactions on Computers, vol. 54, No. 7, Jul. 1, 2005, (pp. 813-824).
Jun Rao et al., Making B+—Trees Cache Conscious in Main Memory, XP003000891, ACM Proceedings of Sigmod, International Conference on Management of Data, XX, XX LNKD, May 1, 2000, (pp. 475-486).
Douglas Comer, The Ubiquitous B-Tree, ACM Computing Surveys, ACM, New York, NY, vol. 11, No. 2, Jun. 1, 1979, (pp. 121-137).
European Patent Office Communication pursuant to Article 94(3) EPC, European search opinion for Application No. 10 003 291.1-1225, mailed Feb. 10, 2012, Huawei Technologies C., LTD 11 pgs.

* cited by examiner

*Primary Examiner* — Jung Park
(74) *Attorney, Agent, or Firm* — Finnegan, Henderson, Farabow, Garrett & Dunner LLP

(57) ABSTRACT

A tree-based node insertion method and a memory device are disclosed in embodiments of the present invention. The tree-based node insertion method includes: according to the key value of a node to be inserted, searching in a primary tree for the nearest node whose key value is smaller than and the most approximate to the key value of the node to be inserted; judging whether the current secondary tree is full, and if so, selecting a node from the current secondary tree as a split node, transferring all the nodes on the right of the split node in the current secondary tree to the new secondary tree, and if not, inserting the node to be inserted into the current secondary tree.

16 Claims, 12 Drawing Sheets

TREE-BASED NODE INSERTION METHOD AND MEMORY DEVICE

CROSS-REFERENCE TO RELATED APPLICATION

This application claims priority to Chinese Patent Application No. 200910132653.4, filed on Mar. 30, 2009, which is hereby incorporated by reference in its entirety.

FIELD OF THE INVENTION

The present invention relates to memory technologies, and in particular, to a tree-based node insertion method and a memory device.

BACKGROUND

A tree-based data structure includes multiple nodes, which are combined based on specific relationships. Each node in a non-empty tree has a key value that uniquely identifies the node. In a binary tree, the key value is represented by the key.

The binary tree is a tree-based data structure where each node has at most two child nodes. Supposing that a node in the binary tree is specified as a parent node, to distinguish the two child nodes of the parent node, the two child nodes are called the left child node and the right child node. In a binary tree, all the nodes and their child nodes are based on this relationship: the key value of a left child node is greater than the key value of its parent node, and the key value of the parent node is greater than the key value of its right child node.

The method for inserting a node into a binary tree is as follows: comparing the key value of the node to be inserted with the key value of the root node of the binary tree, and if the key value of the node to be inserted is smaller than the key value of the root node, inserting the node into the left subtree of the root node, and if not, inserting the node into the right subtree of the root node; comparing the key value of the node to be inserted with the key value of the root node in the left or right subtree, and proceeding like this until the node to be inserted is inserted into the binary tree as a new leaf node. If the shape of the binary tree is fixed (sometimes, it may be understood as the height of the tree is fixed), the insertion of the node into a binary tree as a new leaf node can be interpreted as follows: The node to be inserted is inserted into a virtual position, and then the existing nodes and the nodes to be inserted are transferred based on the relationship that the key value of a left child node is greater than the key value of its parent node and the key value of a parent node is greater than the key value of its right child node.

During the implementation of the present invention, the inventor finds that the prior art has the following defects: If new nodes are to be inserted in a tree with a fixed shape, the existing nodes need to be transferred, and the number of nodes to be transferred exponentially increases with the height of the tree. This causes the increase of the time spent on node insertion sharply. In addition, inserting nodes into the existing tree-based data structure takes too much time.

SUMMARY

The embodiments of the present invention provide a tree-based node insertion method and a memory device to increase the speed of node insertion.

To solve the preceding technical problems, the embodiments of the tree-based node insertion method provided by the present invention can be implemented in the following technical solution:

according to the key value of the node to be inserted, searching for the nearest node in a primary tree, where the key value of the nearest node is smaller than and the most approximate to the key value of the node to be inserted; the key value of the root node of the primary tree is initialized to the minimum key value, where the primary tree includes a parent node as well as a left child node and a right child node that belong to the parent node, the key value of the left child node is greater than the key value of the parent node, and the key value of the parent node is greater than the key value of the right child node;

specifying the secondary tree to which the external pointer of the nearest node in the primary tree points as the current secondary tree, and judging whether the current secondary tree is full, if the current secondary tree is full, selecting a node from the current secondary tree as a split node, inserting the split node into the primary tree as a new node, assigning a new secondary tree to the new node in the primary tree, pointing the external pointer of the new node in the primary tree to the new secondary tree, transferring all the nodes on the left of the split node in the current secondary tree to the new secondary tree, and then searching for the nearest node in the primary tree, if the current tree is not full, inserting the node to be inserted into the current secondary tree.

Another tree-based node insertion method is provided in an embodiment of the present invention, including:

according to the key value of the node to be inserted, searching a primary tree for the nearest node whose key value is greater than and the most approximate to the key value of the node to be inserted; the key value of the root node of the primary tree is initialized to the maximum key value; the key value of a left child node in the primary tree is greater than the key value of its parent node, and the key value of the parent node is greater than the key value of its right child node;

specifying the secondary tree to which the external pointer of the nearest node in the primary tree points as the current secondary tree, and judging whether the current secondary tree is full, if the current tree is full, selecting a node from the current secondary tree as a split node, inserting the split node into the primary tree as a new node, assigning a new secondary tree to the new node in the primary tree, pointing the external pointer of the new node in the primary tree to the new secondary tree, transferring all the nodes on the right of the split node in the current secondary tree to the new secondary tree, and then searching for the nearest node in the primary tree;

if the current tree is not full, inserting the node to be inserted into the current secondary tree.

A memory device is further provided in an embodiment of the present invention, including:

a secondary tree memory unit, adapted to store a secondary tree;

a primary tree memory unit, adapted to store a primary tree that has a node with an external pointer pointing to the secondary tree.

BRIEF DESCRIPTION OF THE DRAWINGS

For better description of embodiments of the present invention or technical solution in the prior art, the following briefly describes the required drawings. It is apparent that these drawings are only some embodiments of the present invention, and those skilled in the art may obtain other drawings based on these drawings without creative work.

DETAILED DESCRIPTION OF EMBODIMENTS

The objectives of the embodiments of the present invention are to provide a tree-based node insertion method and a memory device, to increase the speed of node insertion.

Figure 1:
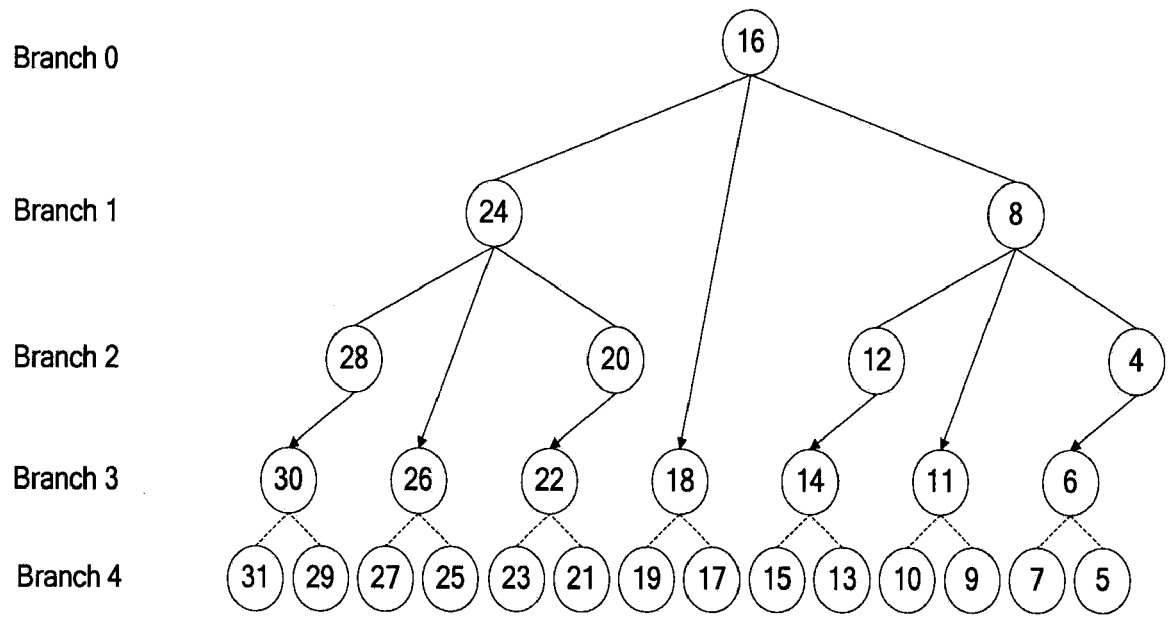
FIG. 1 is a schematic diagram showing a tree-based data structure in an embodiment of the invention.

Before the embodiments of the present invention are described, the names involved in the tree-based data structure are described. By taking the binary tree as an example, as shown in FIG. 1, each circle represents one node and the number in a circle represents the corresponding key value of the node. Based on a specific relationship that is indicated by solid lines, the nodes on the three layers, namely, branch 0, branch 1, and branch 2 are combined as a tree. This tree is called a primary tree. Based on another specific relationship that is indicated by dashed lines, the nodes on the two layers, namely, branch 3 and branch 4 are combined as seven trees.

Each of the seven trees is called a secondary tree. Each of the nodes in the primary tree has an external pointer (indicated by a line with an arrow) that points to the corresponding secondary tree. It is understood that the height of the primary tree, height of the secondary tree, number of external pointers of the nodes in the primary tree and number of secondary trees can be set according to the conditions such as the data amount to be stored. FIG. 1 should not be considered as a limitation on the scope of the embodiments of the present invention. Unless otherwise specified in the following embodiments, the bigger node refers to a node with a greater key value, and the smaller node refers to a node with a smaller key value. In the embodiments of the present invention, after the heights of the primary tree and the secondary tree are fixed, the data operations such as insertion and deletion do not change the maximum heights of the primary tree and the secondary tree.

The tree-based data structure in the embodiments of the present invention is an ordered data structure. For better illustration purposes, the nodes on the left are defined as big nodes and the nodes on the right are defined as small nodes. It is understood that the left node and right node are two relative concepts, which only indicate the relationships between two key values and should not be regarded as limitation on the scope of the embodiments of the present invention. For any node in a primary tree that is built based on the relationships of key values, the key value of its left node is greater than that of its own and the key value of its right node is smaller than that of its own.

The following describes the concepts covered in a tree-based data structure by taking a primary tree as an example as shown in FIG. 1.

A node 16 does not have a corresponding upper-layer node in the primary tree and a node 30 does not have a corresponding upper-layer node in the secondary tree. In this case, the node 16 is called the root node of the primary tree and the node 30 is called the root node of the secondary tree to which the node 30 belongs.

The upper-layer node (namely, the node 16) directly associated with a node 24 is called the parent node of the node 24, and the node 24 is called the child node of the node 16. It can be seen that a node 8 is also the child node of the node 16. To distinguish the node 24 and the node 8, the node 24 can be called the left child node of the node 16, and the node 8 can be called the right child node of the node 16. In addition, the nodes linked by the parent-child relationship are logically adjacent and thus called adjacent nodes.

It can be seen that the left child node and the right child node can have their own child node. All the child nodes are called the offspring of the node 16. The left child node (namely, the node 24) of the node 16 and the offspring of the node 24 are in a tree-based structure that can be called the left subtree of the node 16. Similarly, the tree structure formed by the right child node (namely, the node 8) and the offspring of the node 8 can be called the right subtree of the node 16.

The nodes such as a node 28 and a node 20 do not have corresponding child nodes in the primary tree and thus can be called leaf nodes of the primary tree.

Figure 2:
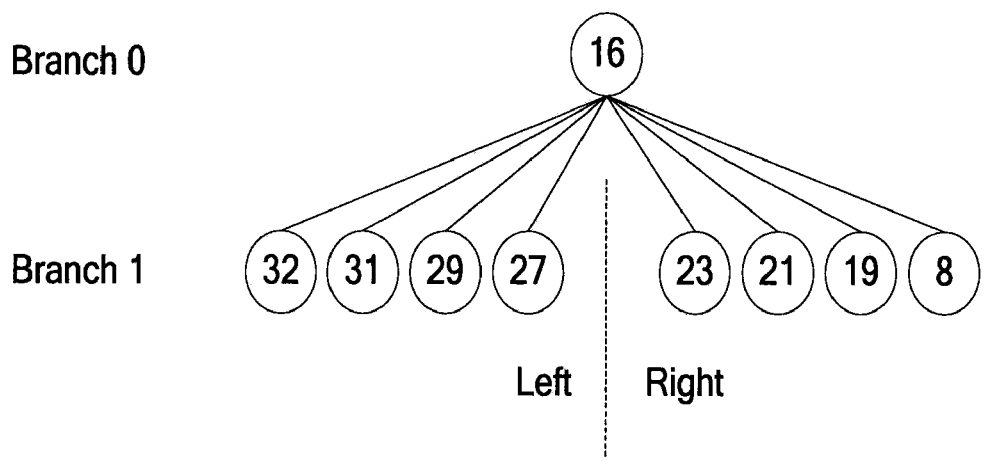
FIG. 2 is a schematic diagram showing a multi-tree in the prior art.

FIG. 2 illustrates a multi-tree, which is built with the nodes on the layers of branch 0 and branch 1, based on a specific relationship indicated by solid lines. The multi-tree is similar to the binary tree except that each node in the multi-tree may have multiple child nodes. Supposing that a node (for example, node 16) in the multi-tree is specified as the current node. Similar to the binary tree, the child nodes of the current node can be classified into the left child node (on the left of the dashed line) and the right child node (on the right of the dashed line). The difference from the binary tree lies in that there can be multiple left child nodes and multiple right child nodes in a multi-tree. The relationship between the current node and its child nodes in a multi-tree is similar to the relationship in the binary tree: the key value of the left child node is greater than the key value of the current node and the key value of the current node is greater than the key value of the right child node. In addition, the left child nodes and the right child nodes can be arranged in an order. In FIG. 2, the left child nodes and the right child nodes are arranged in descending order from left to right. To be specific, the left child nodes are node 32, node 31, node 29 and node 27 from left to right and the right child nodes are node 23, node 21, node 19, and node 8 from left to right. The left child nodes and the right child nodes can also be arranged in ascending order. It is understandable that the operations on a multi-tree such as insertion, searching, and deletion are similar to the operations on a binary tree. The embodiments of the present invention take the binary as an example for illustration, and the tree mentioned in the embodiments can also be a multi-tree. Therefore, the binary tree should not be considered as a limitation on the scope of the present invention.

Embodiment 1

Figure 3:
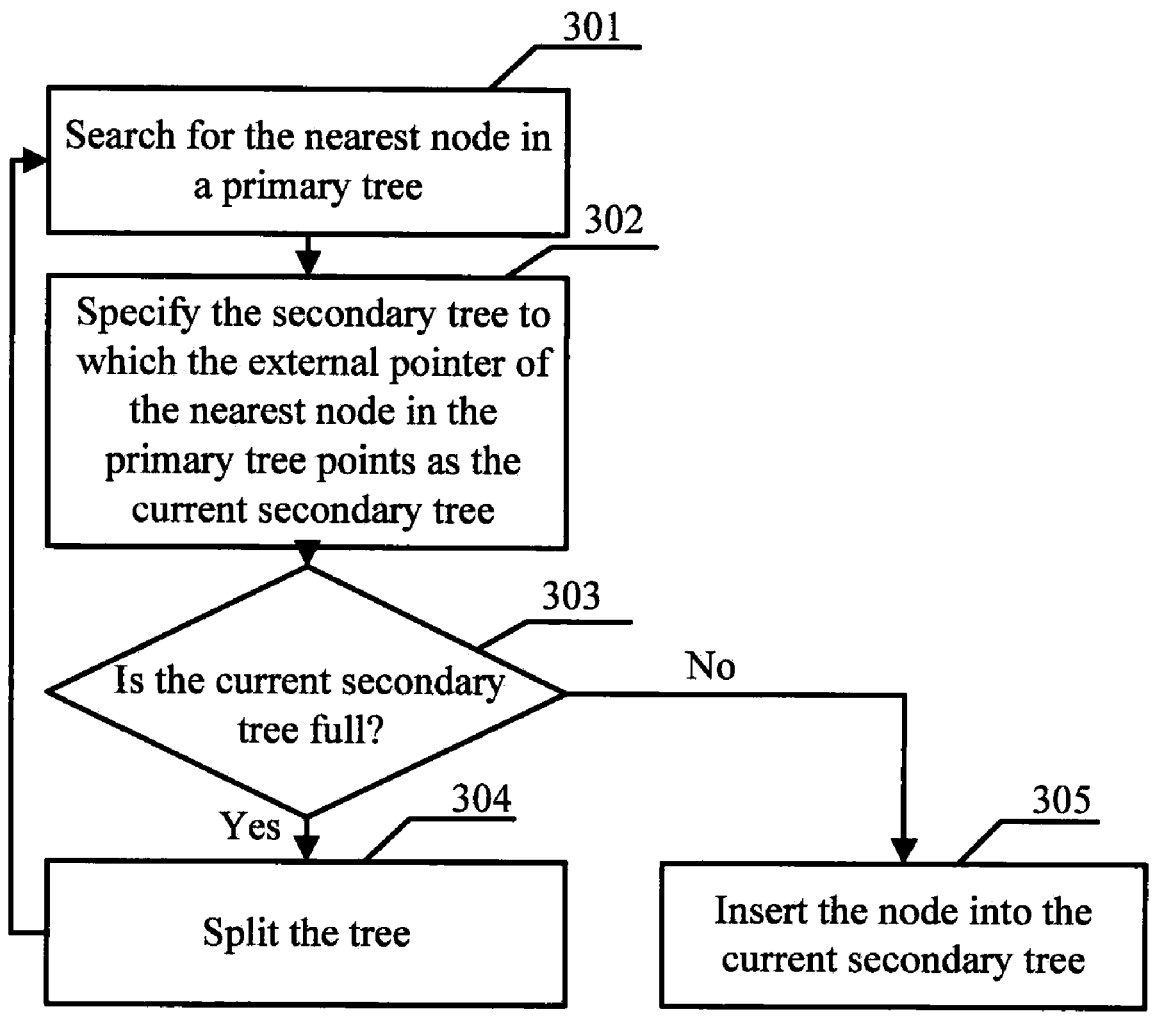
FIG. 3 is a flowchart of a method for inserting a node according to embodiment 1 of the present invention.

As shown in FIG. 3, a tree-based node insertion method is provided in this embodiment of the present invention, including:

301: According to the key value of the node to be inserted, search for the nearest node in a primary tree, whose key value is smaller than and the most approximate to the key value of the node to be inserted; the key value of the root node of the primary tree is initialized to the minimum key value, wherein the primary tree includes a parent node as well as a left child node and a right child node belonging to the parent node, the key value of the left child node is greater than the key value of the parent node, and the key value of the parent node is greater than the key value of the right child node.

In a tree, the key value of the node to be inserted is confined to a specific range. The minimum key value can be the minimum value within the range or any value that is smaller than the values within the range.

The preceding method for searching for the nearest node in a primary tree is to search in the primary tree for the node whose key value is smaller than and the most approximate to the key value of the node to be inserted. The following embodiment provides an implementation scheme for searching for the nearest node in a primary tree:

302: Specify the secondary tree to which the external pointer of the nearest node in the primary tree points as the current secondary tree.

303: Judge whether the current secondary tree is full, and if so, go to 304, and if not, go to 305.

Whether the secondary tree is full can be judged by using one of the following methods. One method is to judge whether the usage of the current secondary tree reaches the specified usage. If so, the current secondary tree is full; if not, the current secondary tree is not full. The other method is to judge whether the current secondary tree has no empty nodes any more. If so, the current secondary tree is full; if not, the current secondary tree is not full.

304: Select any one of the nodes from the current secondary tree as a split node, insert the split node into the primary tree as a new node, assign a new secondary tree to the new node in the primary tree, point the external pointer of the new node in the primary tree to the new secondary tree, and then transfer all the nodes on the left of the split node in the current secondary tree to the new secondary tree, and then go to 301.

305: Insert the node to be inserted into the current secondary tree.

The insertion method described in the embodiment of the present invention ensures that the height of the secondary tree does not increase too much along with data insertion. Therefore, the time spent on node insertion is reduced and the speed of node insertion is increased.

Figure 4:
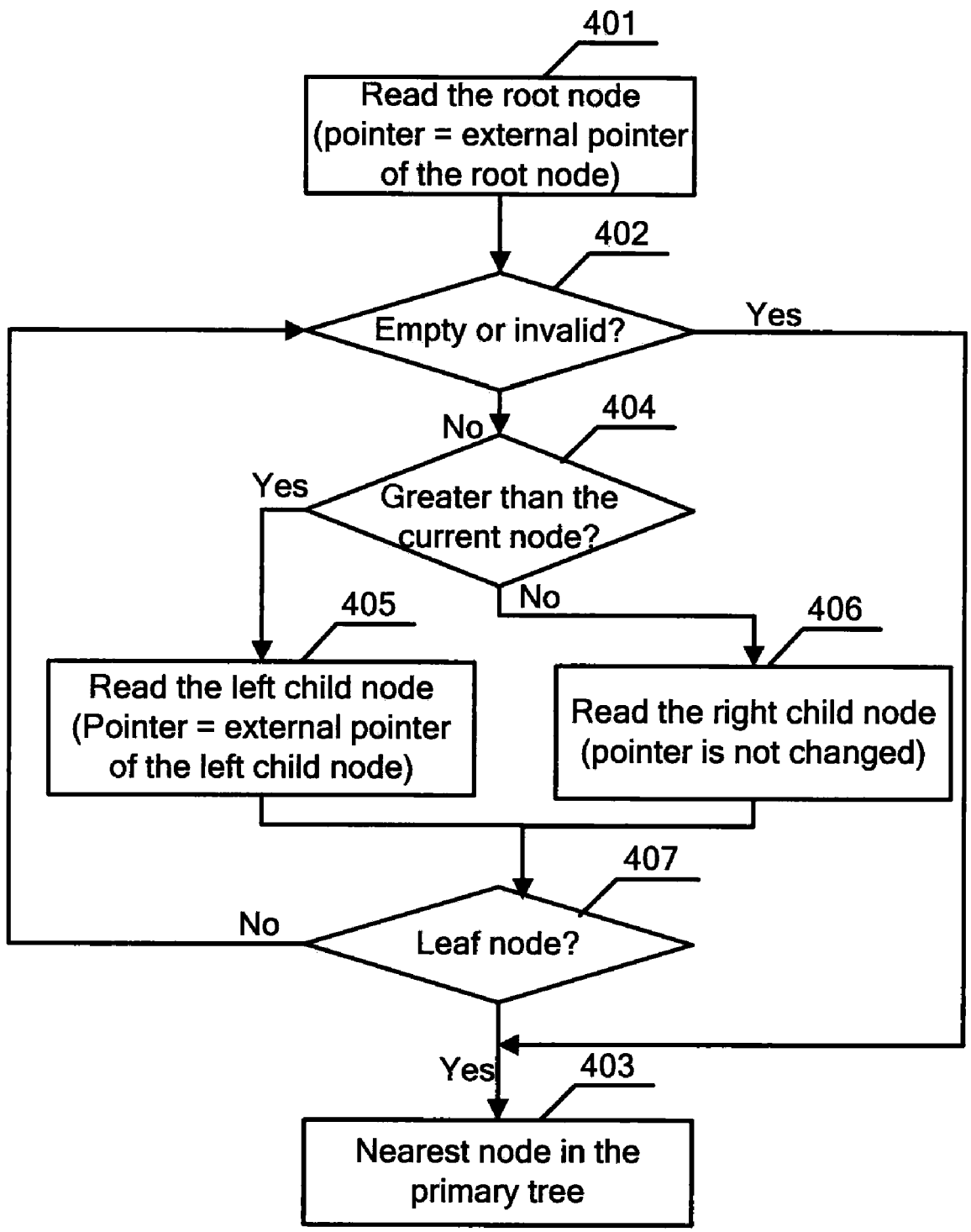
FIG. 4 is a flowchart of a method for searching for the nearest node in the primary tree according to embodiment 1 of the present invention.

Particularly, as shown in FIG. 4, an embodiment of the present invention takes a binary tree as an example to provide an implementation scheme for searching for the nearest node in a primary tree according to the key value of the node to be inserted, and specifying the secondary tree to which the external pointer of the nearest node in the primary tree points as the current secondary tree. The implementation scheme includes:

reading the external pointer of the root node of the primary tree, setting a variant as the external pointer of the root node of the primary tree, and then specifying the root node as the current node;

judging whether the key value of the node to be inserted is greater than the key value of the root node in the primary tree, and if so, setting the variant as the external pointer that points to the left child node of the root node in the primary tree, and specifying the left child node as the current node, and if not, specifying the right child node of the root node in the primary tree as the current node;

judging whether the current node is a leaf node, and if so, specifying the secondary tree, to which the variant points, as the current secondary tree.

The preceding implementation scheme further includes:

judging whether the current node is empty or invalid, and if so, specifying the secondary tree, to which the variant points, as the current secondary tree.

Particularly, the method includes the following steps:

401: Read the external pointer of the root node of the primary tree, set a variant as the external pointer of the root node of the primary tree, and then specify the root node as the current node of the primary tree.

Supposing that the variant is represented by a pointer, the pointer is equivalent to the external pointer of the root node of the primary tree, i.e. pointer=external pointer of the root node of the primary tree.

402: Judge whether the current node of the primary tree is empty or invalid, and if so, go to 403, and if not, go to 404.

403: Specify the secondary tree, to which the variant points, as the current secondary tree.

404: Judge whether the key value of the node to be inserted is greater than the key value of the current node of the primary tree, and if so, go to 405, and if not, go to 406.

405: Set the variant as the external pointer (i.e. pointer=external pointer of the left child node) of left child node of the current node in the primary tree, specify the left child node as the current node of the primary tree, and then go to 407.

If the tree mentioned here is a multi-tree, the operations before setting the variant as the external pointer of the left child node of the current node in the primary tree further include: searching for the left child node of the current node in the primary tree whose key value is smaller than and the most approximate to the key value of the node to be searched, and then setting the variant as the external pointer of the left child node that is found in the primary tree.

406: Specify the right child node of the current node in the primary tree as the current node in the primary tree (the pointer is not changed), and then go to 407.

If the tree described here is a multi-tree, the operations before specifying the right child node of the current node in the primary tree as the current node in the primary tree further include: searching for the right child node of the current node in the primary tree whose key value is smaller than and the most approximate to the key value of the node to be searched, and specifying the right child node of the current node, which is found in the primary tree, as the current node in the primary tree.

407: Judge whether the current node of the primary tree is a leaf node in the primary tree, and if so, go to 403, and if not, go to 402.

The preceding implementation scheme provides a method for searching for the nearest node in a primary tree according to the key value of the node to be inserted and specifying the secondary tree to which the external pointer of the nearest node in the primary tree points as the current secondary tree. It is understood that there are many schemes that can be used to implement the present invention, and thus the present invention should in no way be limited to the illustrative implementation.

Further, balance operation may be performed on the primary tree. The valid nodes in the balanced primary tree may have the minimum height in the primary tree.

Particularly, the balance operation on the primary tree can be triggered in either of the following two conditions: the nodes of a primary tree at any layer except the bottom layer of the primary tree are in the non-empty state; or the number of empty nodes at all layers except at the bottom layer reaches a specified value.

It is understandable that the balance operation on the primary tree can be triggered by many other conditions, for example, when the memory system is in the idle state. Therefore, the present invention is not intended to be limited to the embodiments shown herein.

In the illustrated embodiments, the balance operation on the primary tree reduces the height of the primary tree and thus increases the insertion speed.

Embodiment 2

Figure 5:
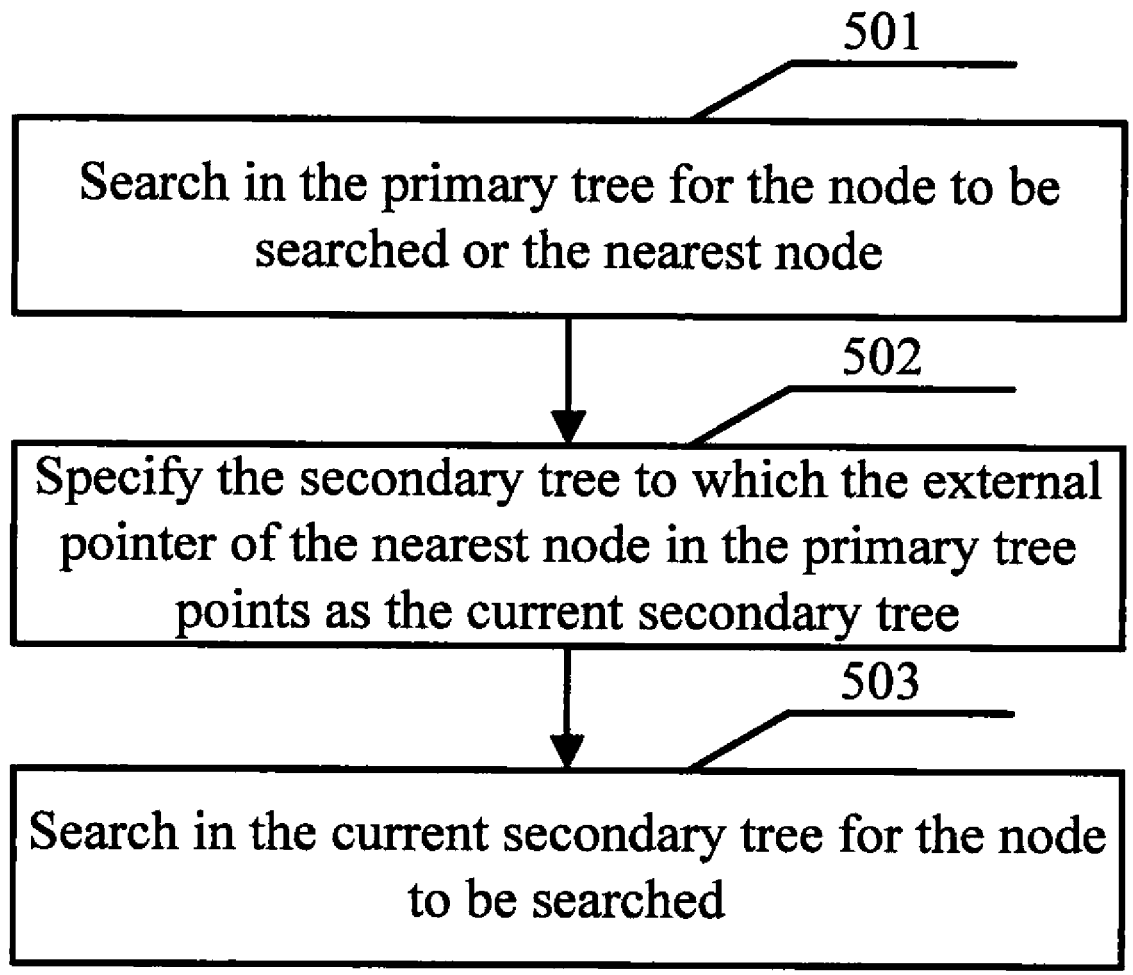
FIG. 5 is a flowchart of a method for searching for a node according to embodiment 2 of the present invention.

As shown in FIG. 5, a tree-based node search method is provided in this embodiment of the present invention, including:

501: Search in the primary tree for the node to be searched according to its key value. If the node to be searched does not exist in the primary tree, then search for the nearest node in the primary tree; the key value of the nearest node in the primary tree is smaller than and the most approximate to the key value of the node to be searched.

If a node in the primary tree has the same key value as the node to be searched, the node to be searched is found, and thus the searching process ends.

502: Specify the secondary tree to which the external pointer of the nearest node in the primary tree points as the current secondary tree.

503: Search for the node to be searched in the current secondary tree.

The preceding implementation scheme increases the speed of node searching, because tree height is reduced.

Figure 6:
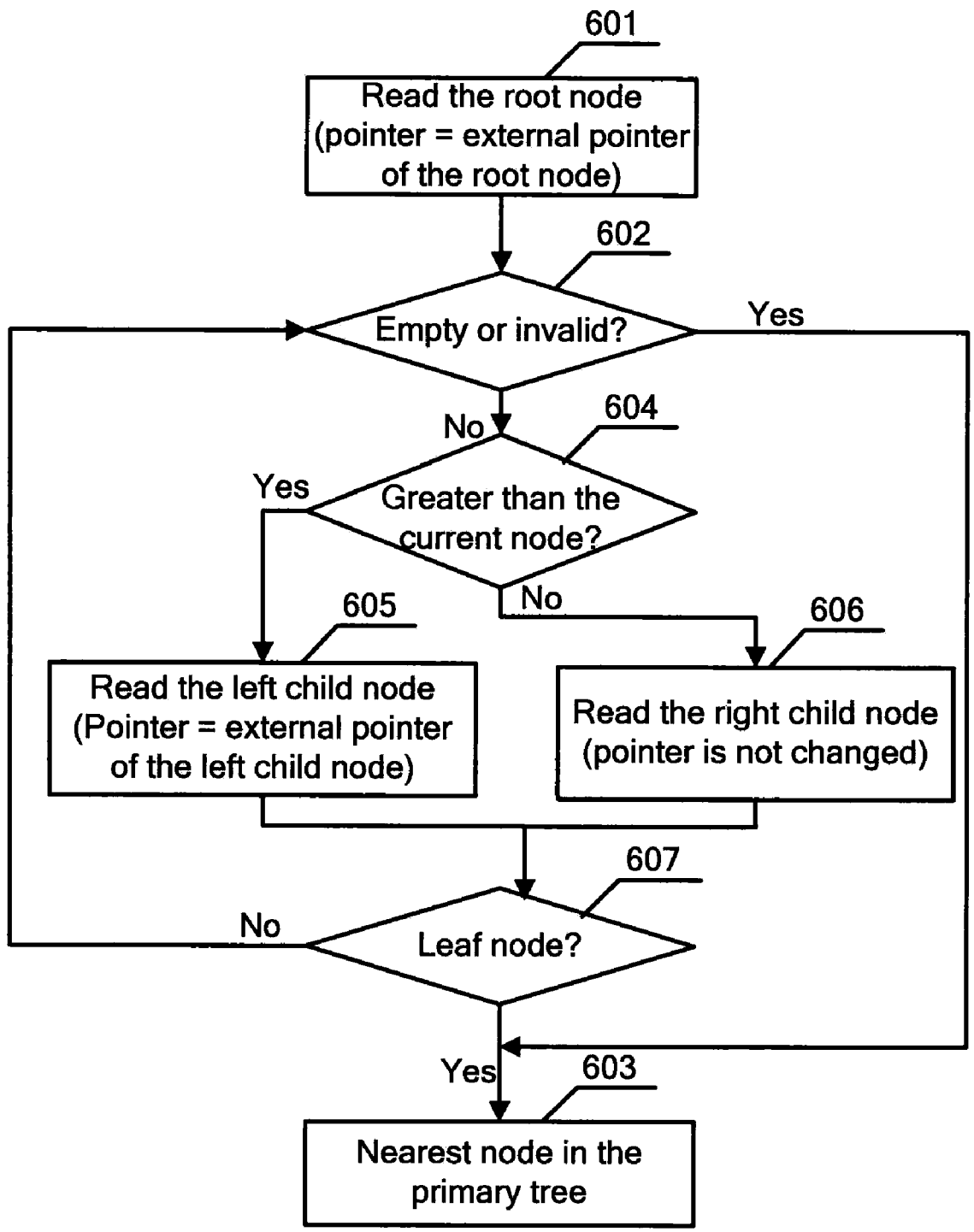
FIG. 6 is a flowchart of a method for searching for the nearest node in the primary tree according to embodiment 2 of the present invention.

Particularly, as shown in FIG. 6, an embodiment of the present invention takes a binary tree as an example to provide an implementation scheme for searching for the nearest node in a primary tree according to the key value of the node to be searched, and specifying the secondary tree to which the external pointer of the nearest node in the primary tree points as the current secondary tree. The implementation scheme includes:

601: Read the external pointer of the root node of the primary tree, set a variant as the external pointer of the root node of the primary tree, and then specify the root node as the current node of the primary tree.

Supposing that the variant is represented by a pointer, the pointer is equivalent to the external pointer of the root node of the primary tree, i.e. pointer=external pointer of the root node of the primary tree.

602: Judge whether the current node of the primary tree is empty or invalid, and if so, go to 603, and if not, go to 604.

603: Specify the secondary tree to which the current variant points as the current secondary tree.

604: Judge whether the key value of the node to be searched is greater than the key value of the current node of the primary tree. If so, go to 605, and if not, go to 606.

605: Set the variant as the external pointer (i.e. pointer=external pointer of the left child node) of the left child node of the current node in the primary tree, specify the left child node as the current node of the primary tree, and then go to 607.

606: Specify the right child node of the current node in the primary tree as the current node in the primary tree (the pointer is not changed), and then go to 607.

607: Judge whether the current node of the primary tree is a leaf node of the primary tree. If so, go to 603, and if not, go to 602.

The preceding implementation scheme provides a method for searching for the nearest node in a primary tree according to the key value of the node to be searched, and specifying the secondary tree to which the external pointer of the nearest node in the primary tree points as the current secondary tree. It is understood that there are many schemes that can be used to implement the present invention, and thus the present invention should in no way be limited to the illustrative implementation.

Embodiment 3

Figure 7:
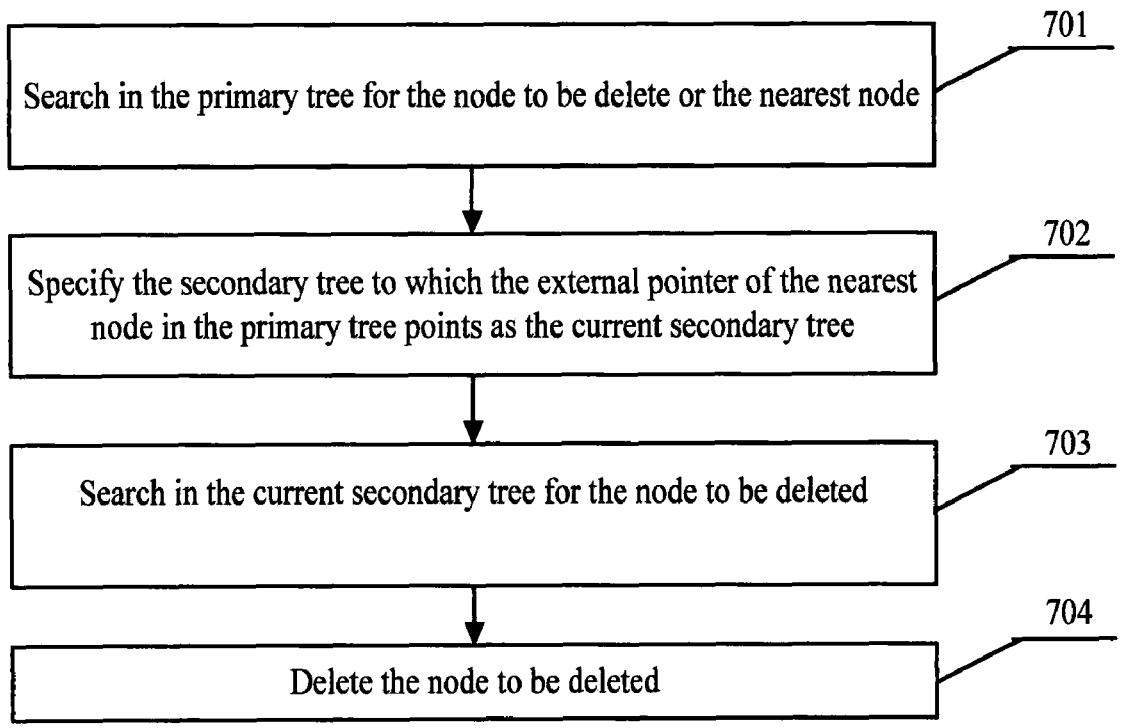
FIG. 7 is a flowchart of a method for deleting a node according to embodiment 3 of the present invention.

As shown in FIG. 7, a tree-based node deletion method is provided in the embodiment of the present invention, including:

701: Search in the primary tree for the node to be deleted according to its key value, and if the node to be deleted does not exist in the primary tree, then search for the nearest node in the primary tree; the key value of the nearest node in the primary tree is smaller than and the most approximate to the key value of the node to be deleted.

If a node in the primary tree has the same key value as the node to be deleted, the node to be deleted is found, and in this case, go to 704;

702: Specify the secondary tree to which the external pointer of the nearest node in the primary tree points as the current secondary tree.

703: Search in the current secondary tree for the node to be deleted;

704: Delete the node that is found.

It can be seen that the present embodiment can be implemented based on embodiment 2. That is, the node to be deleted is found and then deleted. If the node to be deleted is a node in the primary tree, the nodes in the secondary trees, to which the node of the primary tree points can be rearranged. For example, these nodes can be re-inserted. If the node to be deleted is a node in a secondary tree, the nodes in the secondary tree can be arranged.

In the preceding embodiment, the tree height is reduced, and thus the node to be deleted can be found more quickly. Therefore, the speed of node deletion is increased.

Further, as the nodes are deleted from trees, there may be some trees that are not full. In this case, the merging operation can be performed on those trees as follows.

When the number of valid nodes in the secondary trees, to which a first positive integer number of adjacent nodes in the primary tree point, is smaller than the number of nodes that can be accommodated in a second positive integer number of secondary trees (the first positive integer number is greater than the second positive integer number):

merging the first positive integer number of adjacent nodes in the primary tree and the secondary trees, to which the first positive integer number of adjacent nodes point, into the second positive integer number of nodes in the primary tree and the secondary trees, to which the second positive integer number of nodes of the primary tree point.

The following takes an example to illustrate this point, with the first positive integer number being 2 and the second positive integer number being 1.

When the number of valid nodes in the secondary trees, to which two adjacent nodes in the primary tree point, is smaller than the number of nodes that can be accommodated in a secondary tree:

insert the node, which has a greater key value of the two adjacent nodes, and the valid nodes in the secondary tree, to which the node with the greater key value points, into the secondary tree to which the node, which has a smaller key value of the two adjacent nodes, points.

The merging process described above can be interpreted as that the nodes to be merged in the primary tree and the valid nodes of the secondary trees, to which the nodes to be merged point, are re-inserted into the tree-based data structure according to an embodiment of the present invention. The merging operation on trees can be triggered by many conditions, for example, when the memory system is in the idle state. Therefore, the present invention is not intended to be limited to the embodiments shown herein.

In the preceding embodiment, merging the trees that are not full may release memory resources, thus increasing the usage of the memory space.

Embodiment 4

Figure 8:
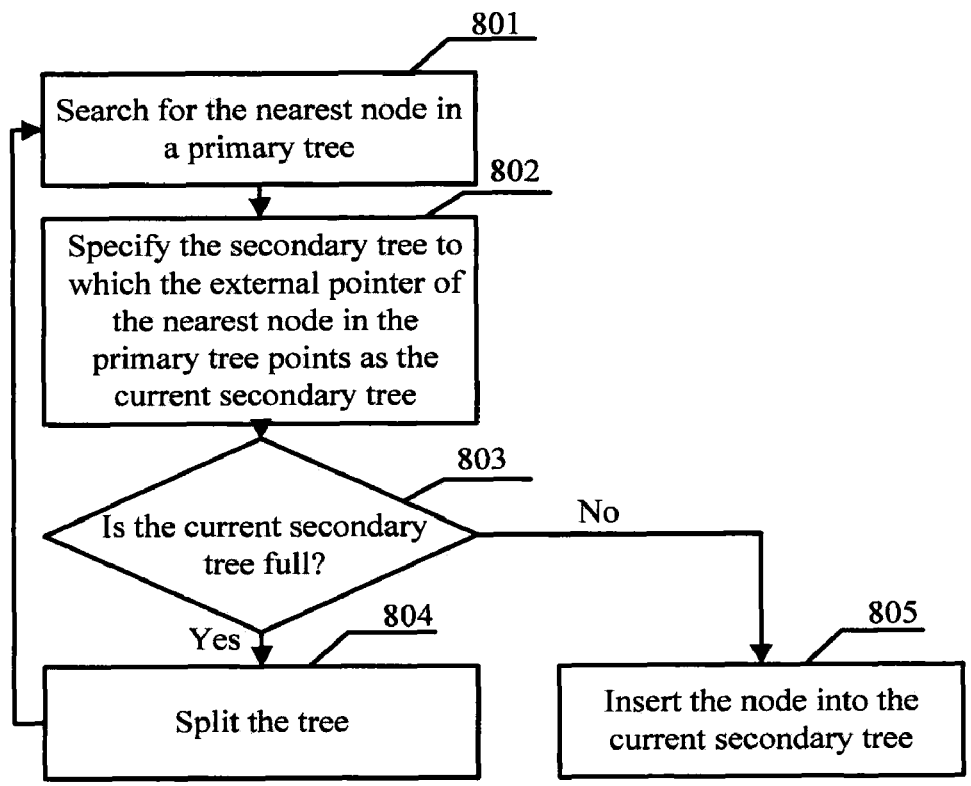
FIG. 8 is a flowchart of a method for inserting a node according to embodiment 4 of the present invention.

As shown in FIG. 8, another tree-based node insertion method is provided in this embodiment of the present invention, including:

801: According to the key value of the node to be inserted, search for the nearest node in a primary tree, whose key value is smaller than and the most approximate to the key value of the node to be inserted; the key value of the root node of the primary tree is initialized to the maximum key value, wherein the primary tree includes a parent node as well as a left child node and a right child node belonging to the parent node, the key value of the left child node is greater than the key value of the parent node, and the key value of the parent node is greater than the key value of the right child node.

In a tree, the key value of the node to be inserted is confined to a specific range. The maximum key value can be the maximum value within the range or a value that is greater than the values within the range.

802: Specify the secondary tree to which the external pointer of the nearest node in the primary tree points as the current secondary tree.

803: Judge whether the current secondary tree is full, and if so, go to 804, and if not, go to 805.

804: Select a node from the current secondary tree as a split node, insert the split node into the primary tree as a new node, assign a new secondary tree to the new node in the primary tree, point the external pointer of the new node in the primary tree to the new secondary tree, transfer all the nodes on the right of the split node in the current secondary tree to the new secondary tree, and then go to 801.

805: Insert the node to be inserted into the current secondary tree.

In the embodiment given above, a tree-based data structure is divided into a primary tree and secondary trees, which reduces the tree height and the time spent on data insertion, thus increasing the node insertion speed.

Figure 9:
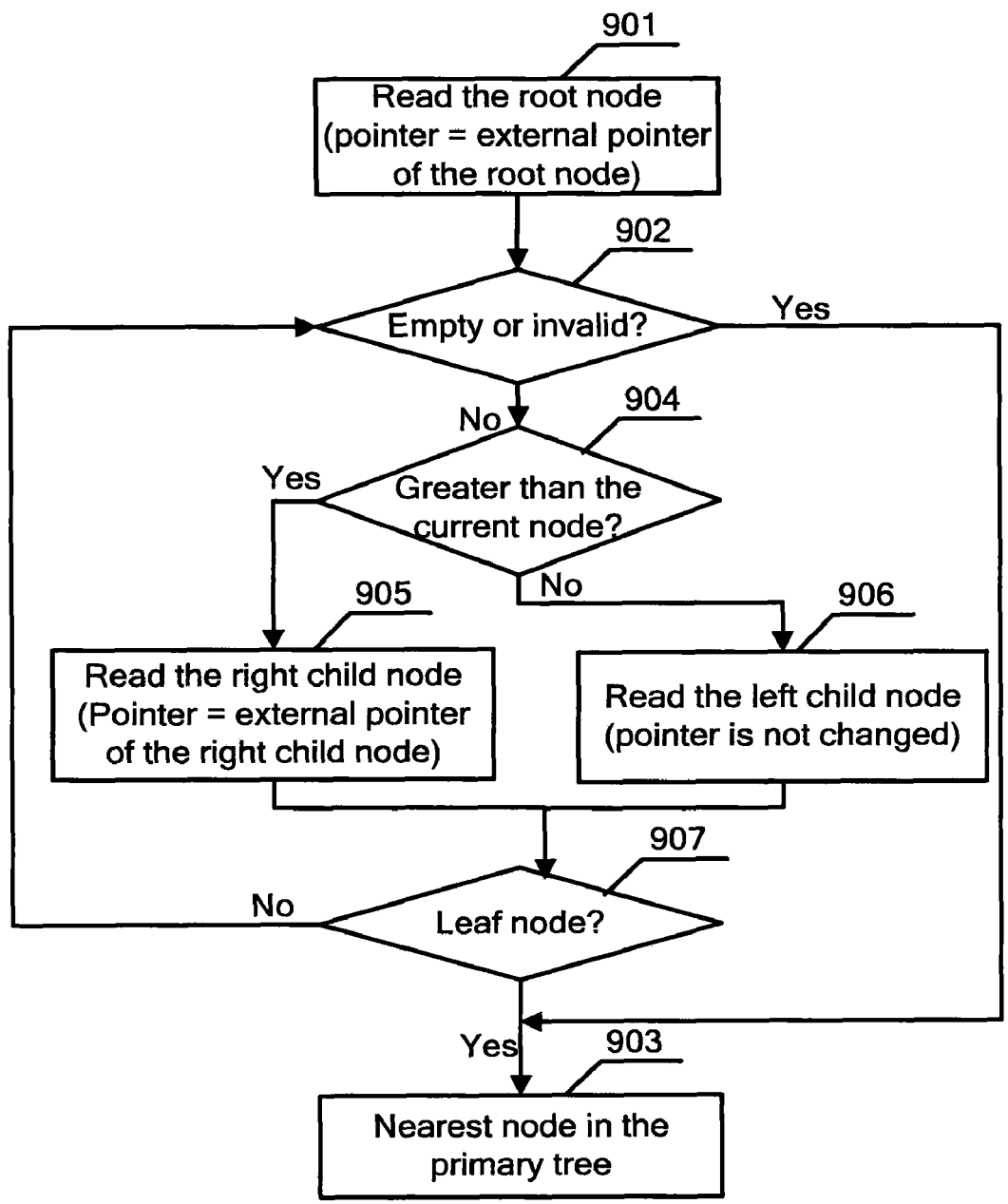
FIG. 9 is a flowchart of a method for searching for the nearest node in the primary tree according to embodiment 4 of the present invention.

Particularly, as shown in FIG. 9, an embodiment of the present invention takes a binary tree as an example to provide an implementation scheme for searching for the nearest node in a primary tree according to the key value of the node to be inserted, and specifying the secondary tree to which the external pointer of the nearest node in the primary tree points as the current secondary tree. The implementation scheme includes:

901: Read the external pointer of the root node of the primary tree, set a variant as the external pointer of the root node of the primary tree, and then specify the root node as the current node of the primary tree.

Supposing that the variant is represented by a pointer, the pointer is equivalent to the external pointer of the root node, i.e. pointer=external pointer of the root node.

902: Judge whether the current node is empty or invalid, and if so, go to 903, and if not, go to 904;

903: Specify the secondary tree, to which the variant points, as the current secondary tree.

904: Judge whether the key value of the node to be inserted is greater than the current node in the primary tree, and if so, go to 906, and if not, go to 905.

905: Set the variant as the external pointer of the right child node of the current node in the primary tree (i.e. pointer=external pointer of the right child node), specify the right child node as the current node, and then go to 907.

906: Specify the left child node of the current node as the current node (the pointer is not changed), and then go to 907.

907: Judge whether the current node is a leaf node of the primary tree, and if so, go to 903, and if not, go to 902.

The preceding implementation scheme provides a method for searching for the nearest node in a primary tree according to the key value of the node to be inserted and specifying the secondary tree to which the external pointer of the nearest node in the primary tree points as the current secondary tree. It is understood that there are many schemes that can be used to implement the present invention, and thus the present invention should in no way be limited to the illustrative implementation.

The essence of embodiment 4 is the same as the essence of embodiment 1, except that the key value of the root node in the primary tree in embodiment 4 is set to the maximum value during initialization. The node search method and node deletion method described in embodiment 4 are also the same as those in embodiments 1 and 2. Specifically, the methods include: searching in the primary tree for the node to be searched or deleted, and if the node is not found, searching for the nearest node in the primary tree; searching for the node to be searched or deleted in the secondary tree, to which the nearest node of the primary tree points; then deleting the node to be deleted. Further details are not given herein. Additionally, if the external pointer of the nearest node in the primary tree points to multiple secondary trees, reference can be made to the methods for inserting a node, searching a node and deleting a node in a multi-tree.

Embodiment 5

Figure 10:
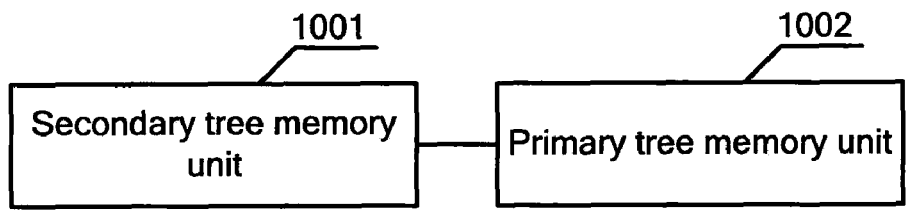
FIG. 10 is a schematic structural view of a memory device according to embodiment 5 of the present invention.

As shown in FIG. 10, a memory device is further provided in the embodiment of the present invention, including:

a secondary tree memory unit 1001, adapted to store a secondary tree;

a primary tree memory unit 1002, adapted to store a primary tree, which has a node with an external pointer pointing to the secondary tree; the key value of the root node of the primary tree is initialized to the minimum key value; the key value of a left child node is greater than the key value of its parent node, and the key value of the parent node is greater than the key value of its right child node.

Optionally, both the secondary tree memory unit and the primary tree memory unit can be random access memories. Other types of memories can also be used to store the primary tree and secondary trees. The present invention should not be limited as such.

Embodiment 6

Figure 11:
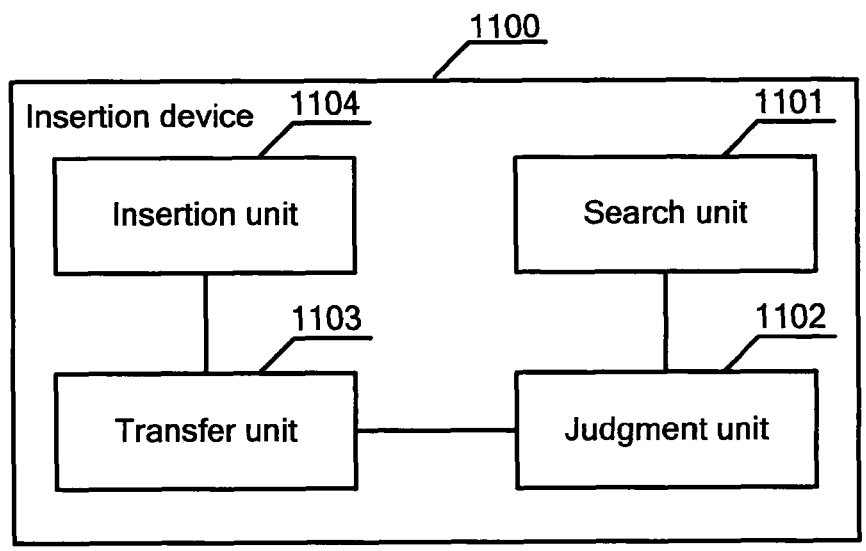
FIG. 11 is a schematic structural view of an insertion device according to embodiment 6 of the present invention.

As shown in FIG. 11, an insertion device 1100 is provided in the embodiment of the present invention, including:

a search unit 1101, adapted to: search in the primary tree for the nearest node according to the key value of the node to be inserted, and search for the nearest node in the primary tree after a transfer unit 1103 transfers all the nodes on the left of a split node in the current secondary tree to the new secondary tree, wherein the key value of the nearest node in the primary tree is smaller than and the most approximate to the key value of the node to be inserted; the key value of the root node of the primary tree is initialized to the minimum key value; the key value of a left child node is greater than the key value of its parent node, and the key value of the parent node is greater than the key value of its right child node;

a judgment unit 1102, adapted to specify the secondary tree to which the external pointer of the nearest node in the primary tree points as the current secondary tree and judge whether the current secondary tree is full;

a transfer unit 1103, adapted to: when the judgment unit judges that the current secondary tree is full, select a node from the current secondary tree as a split node, insert the split node into the primary tree as a new node, assign a new secondary tree to the new node in the primary tree, point the external pointer of the new node in the primary tree to the new secondary tree, and then transfer all the nodes on the left of the split node in the current secondary tree to the new secondary tree;

an insertion unit 1104, adapted to: when the current secondary tree is not full, insert the node to be inserted into the current secondary tree.

Figure 12:
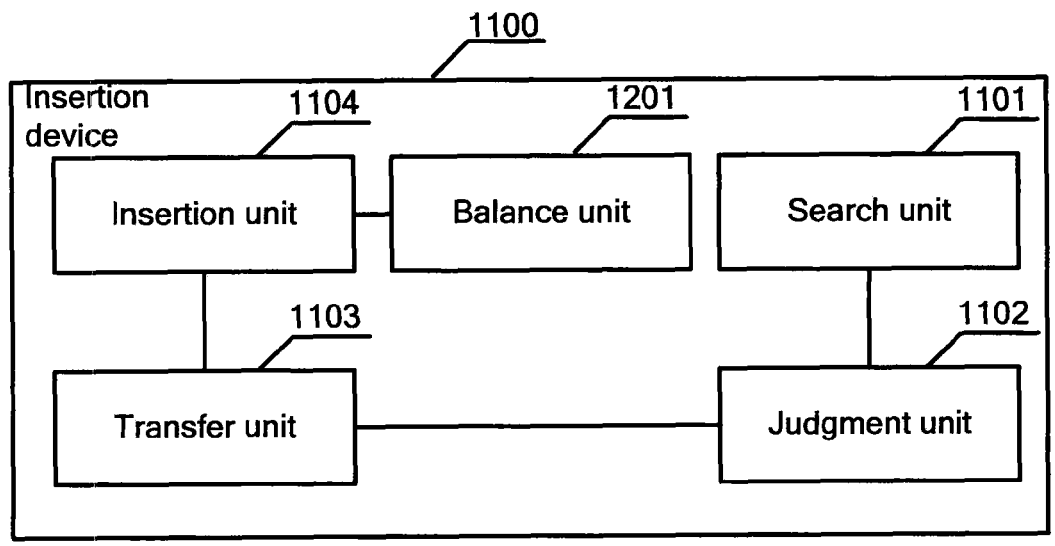
FIG. 12 is a schematic structural view of an insertion device comprising a balance unit according to embodiment 6 of the present invention.

As shown in FIG. 12, the insertion device may further include:

a balance unit 1201, adapted to perform balance operation on the primary tree. If a primary tree is balanced, the depths of its valid nodes may reach the minimum value.

Embodiment 7

Figure 13:
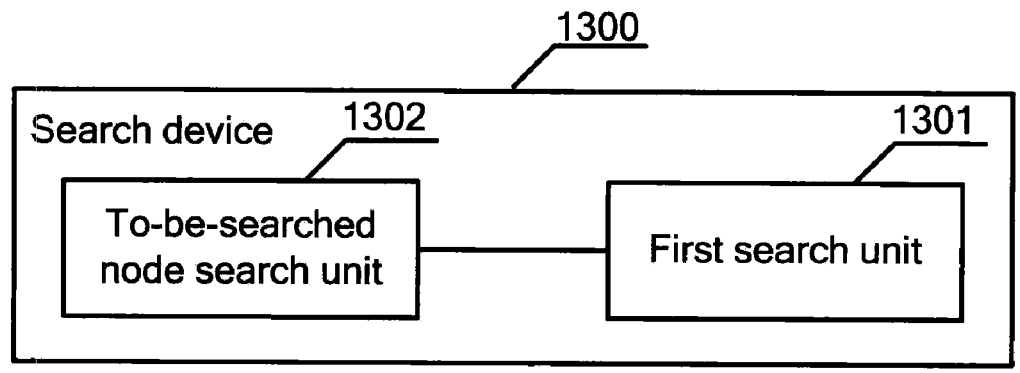
FIG. 13 is a schematic structural view of a search device according to embodiment 7 of the present invention.

As shown in FIG. 13, a search device 1300 is further provided in this embodiment of the present invention, including:

a first search unit 1301, adapted to search in the primary tree for the node to be searched according to its key value, and if the node to be searched does not exist in the primary tree, then search for the nearest node in the primary tree; the key value of the nearest node in the primary tree is smaller than and the most approximate to the key value of the node to be searched; if the node to be searched exists in the primary tree and node is found, the search process ends;

a to-be-searched node search unit 1302, adapted to: specify the secondary tree, to which the external pointer of the nearest node of the primary tree points, as the current secondary tree; search in the current secondary tree for the node to be searched;

The search device 1300 described above can be a Field-Programmable Gate Array (FPGA) or an Application Specific Integrated Circuits (ASIC), but is not limited as such. Other types of physical entities that can implement the functions provided by the search device 1300 can also be used.

Embodiment 8

Figure 14:
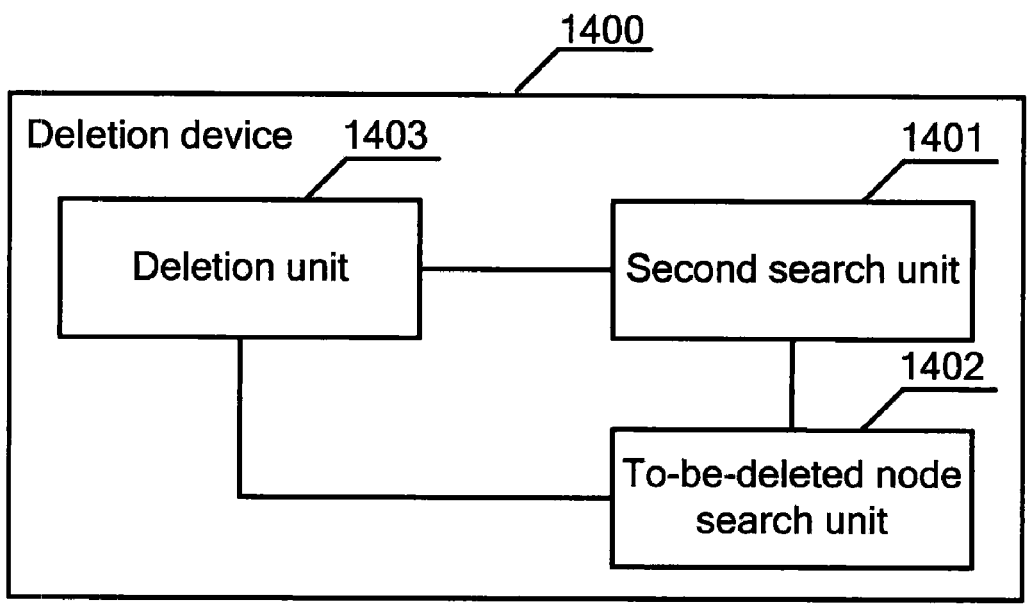
FIG. 14 is a schematic structural view of a deletion device according to embodiment 8 of the present invention.

As shown in FIG. 14, a deletion device 1400 is further provided in this embodiment of the present invention, including:

a second search unit 1401, adapted to: search in the primary tree for the node to be deleted according to the key value of the node to be deleted, and if the node to be deleted does not exist in the primary tree, search for the nearest node in the primary tree; the key value of the nearest node in the primary tree is smaller than and the most approximate to the key value of the node to be deleted;

a to-be-deleted node search unit 1402, adapted to: specify the secondary tree, to which the external pointer of the nearest node of the primary tree points, as the current secondary tree; search in the current secondary tree for the node to be deleted;

a deletion unit 1403, adapted to delete the node that is found.

Embodiment 9

Figure 15:
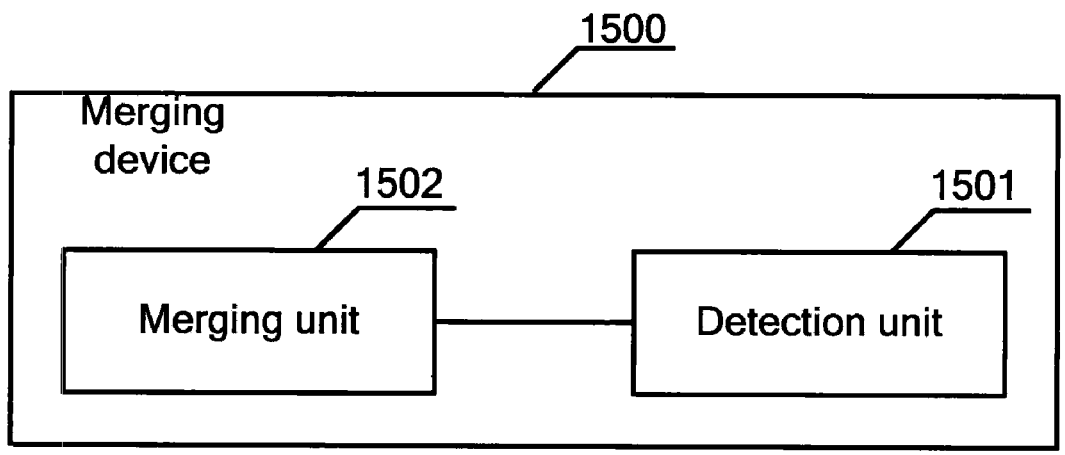
FIG. 15 is a schematic structural view of a merging device according to embodiment 9 of the present invention.

As shown in FIG. 15, a merging device 1500 is further provided in this embodiment of the present invention, including:

a detection unit 1501, adapted to: detect whether the number of valid nodes in the secondary trees, to which a first positive integer number of adjacent nodes of the primary tree point, is smaller than the number of nodes that can be accommodated in a second positive integer number of secondary trees, and the first positive integer number is greater than the second positive integer number;

a merging unit 1502, adapted to: when the detection result obtained by the detection unit 1501 is YES, merge the first positive integer number of adjacent nodes in the primary tree and the secondary trees, to which the first positive integer number of adjacent nodes point, into the second positive integer number of nodes of the primary tree and the secondary trees, to which the second positive integer number of nodes of the primary tree point.

Embodiment 10

Figure 16:
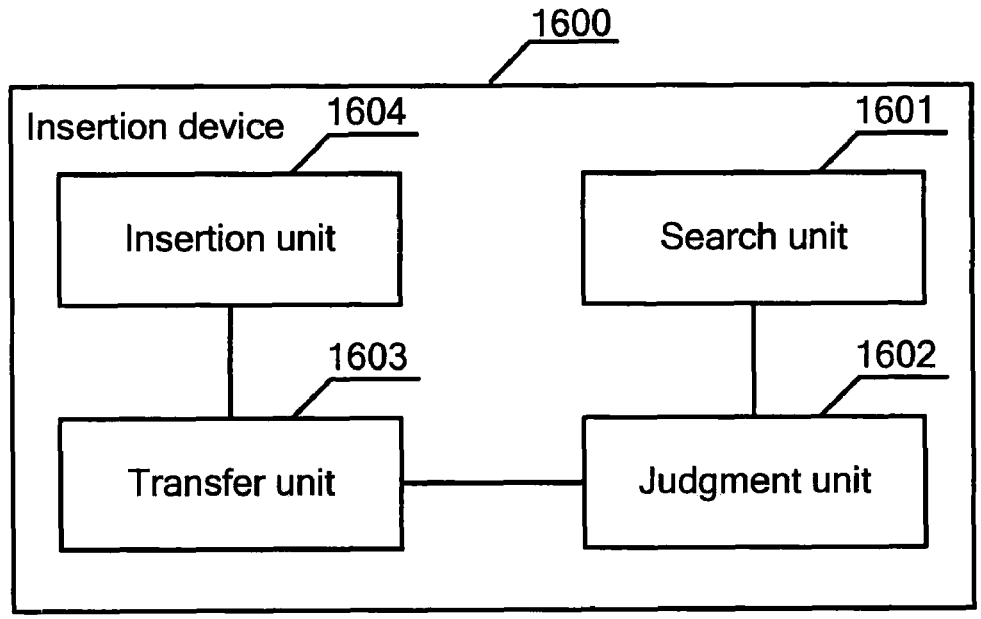
FIG. 16 is a schematic structural view of an insertion device according to embodiment 10 of the present invention.

As shown in FIG. 16, an insertion device 1600 is further provided in this embodiment of the present invention, including:

a search unit 1601, adapted to: search in the primary tree for the nearest node according to the key value of the node to be inserted, and search for the nearest node in the primary tree after a transfer unit 1603 transfers all the nodes on the right of a split node in the current secondary tree to the new secondary tree, wherein the key value of the nearest node in the primary tree is greater than and the most approximate to the key value of the node to be inserted; the key value of the root node of the primary tree is initialized to the maximum key value; the key value of a left child node is greater than that of its parent node, and the key value of the parent node is greater than that of its right child node;

a judgment unit 1602, adapted to specify the secondary tree to which the external pointer of the nearest node in the primary tree points as the current secondary tree and judge whether a current secondary tree is full;

a transfer unit 1603, adapted to: when the judgment unit 1602 judges that the current secondary tree is full, select any of the nodes from the current secondary tree as a split node, insert the split node into the primary tree as a new node, assign a new secondary tree to the new node in the primary tree, point the external pointer of the new node in the primary tree to the new secondary tree, and then transfer all the nodes on the right of the split node in the current secondary tree to the new secondary tree;

an insertion unit 1604, adapted to: when the judgment unit 1602 judges that the current secondary tree is not full, insert the node to be inserted into the current secondary tree.

Embodiment 11

A communication apparatus is further provided in this embodiment of the present invention, including:

the memory device described in embodiment 5 and at least one of the devices described in embodiments 6 to 9; or the memory device described in embodiment 5 and at least one of the devices described in embodiments 6 to 10.

Embodiment 12

Figure 17:
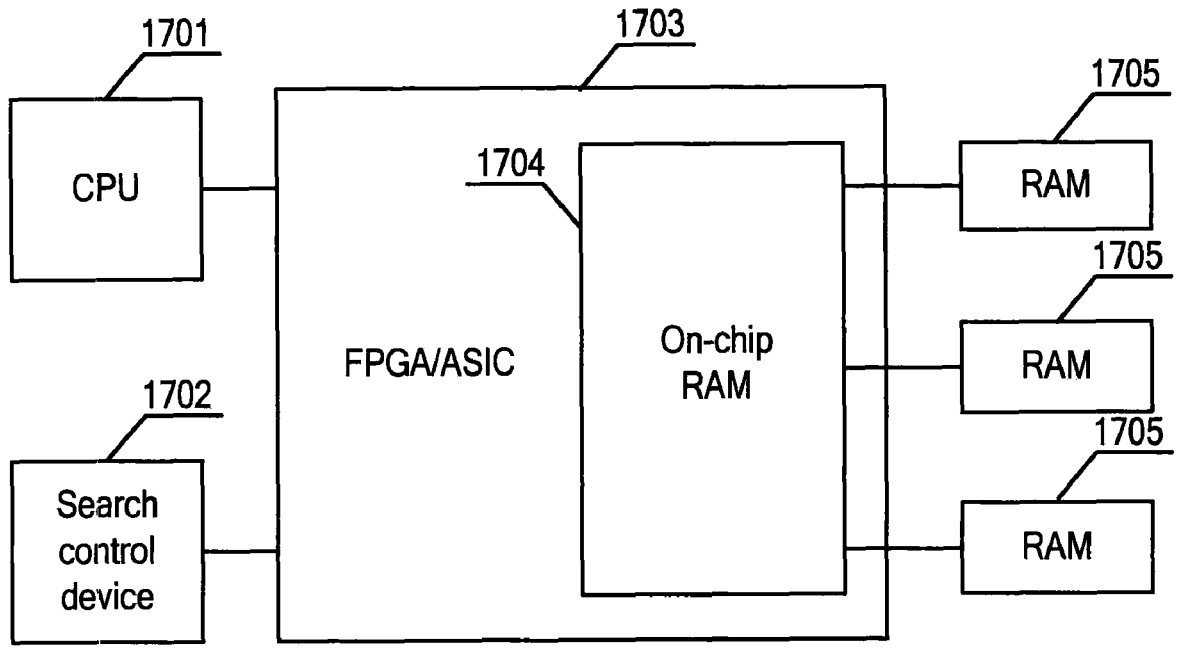
FIG. 17 is a schematic structural view of an application environment according to embodiment 12 of the present invention.
Figure 18:
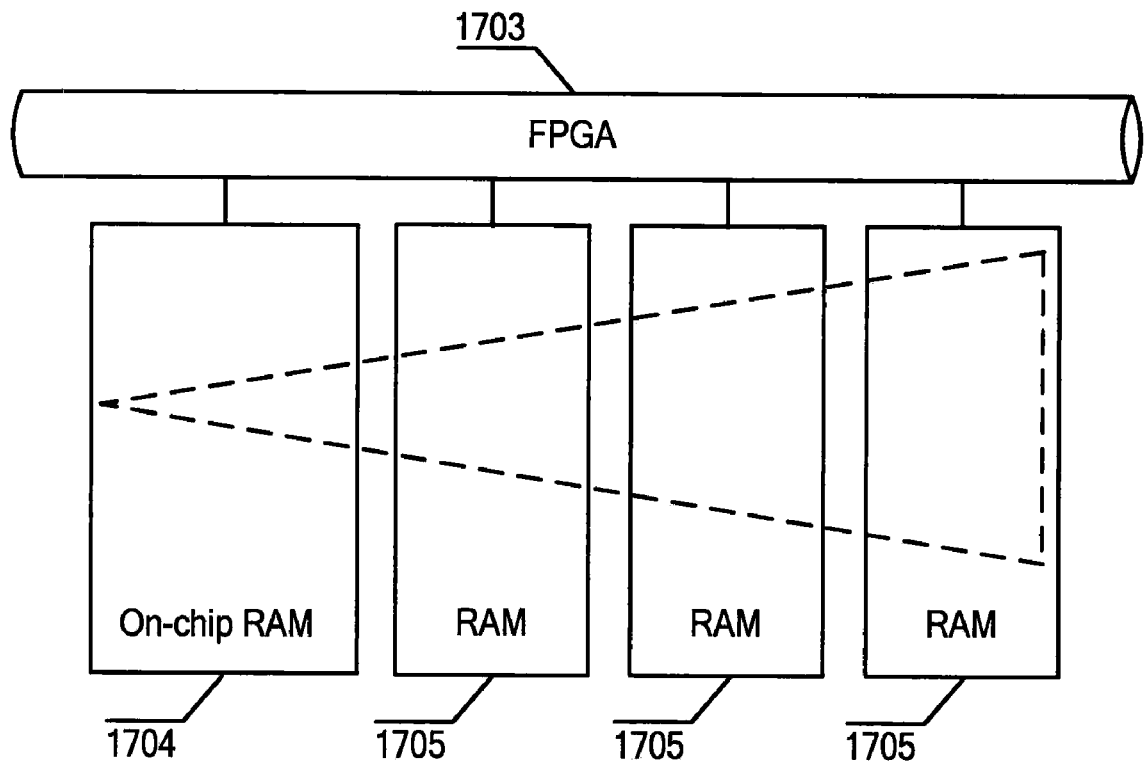
FIG. 18 is a schematic structural view of an FPGA and RAMs according to embodiment 12 of the present invention.

As shown in FIG. 17 and FIG. 18, an application environment for the methods or devices described in embodiments 1 to 11 is provided in this embodiment of the present invention. In the application environment:

an FPGA 1703 is provided, which can also be an ASIC;

the FPGA 1703 may have two interfaces: a management interface connected to a Central Processing Unit (CPU) 1701 and a search interface connected to a search control device 1702; the search control device 1702 can be a network processor of a router;

an on-chip Random-Access Memory (RAM) 1704 can be integrated into the FPGA 1703, and external RAMs 1705 can be connected to the FPGA 1703; both the on-chip RAM 1704 and RAMs 1705 are used to store primary and secondary trees; in this embodiment of the present invention, it is possible to use only the on-chip RAM 1704 to store the secondary and primary trees or use only the RAMs 1705 to store primary and secondary trees; as shown in FIG. 18, the triangle indicated by dashed lines is a schematic view of a tree stored in the on-chip RAM 1704 and the RAMs 1705 according to an embodiment of the present invention, and FIG. 18 roughly illustrates the storage positions of each part of a tree in the RAM 1704 and RAMs 1705;

a search control device 1702 sends a search instruction to the FPGA 1703 through the search interface, and then receives the search result through the search interface; the search function can be performed by the FPGA 1703. For details about how to implement the search function, reference can be made to the methods and devices described in the preceding embodiments of the present invention.

The CPU 1701 sends a tree management instruction to the FPGA 1703 through the management interface. The tree management instruction may be an insertion instruction, a deletion insertion or another instruction. After receiving the tree management instruction, the FPGA 1703 starts to manage the tree. For the implementation of tree management, reference can be made to the preceding methods or devices for node insertion, node deletion, etc.

In the embodiment, the CPU 1701, FPGA 1703, on-chip RAM 1704, and RAM 1705 can be deployed in the same communication apparatus. The search control device 1702 can be connected to the communication apparatus through the search interface and is outside the communication apparatus.

In the embodiment, the FPGA 1703 may have the management interface only. In this case, the search control device 1702 as shown in FIG. 17 is not necessary. The FPGA 1703 may also have the search interface only. In this case, the CPU 1701 as shown in FIG. 17 is not necessary.

In the embodiment, the key value can be the value of a Media Access Control (MAC) address or a combination of the MAC address and other information. The other information can be related to a Virtual Local Area Network (VLAN) address and is not limited as such. The MAC address, VLAN address, and the combination of the MAC address and other information are to be considered as illustrative and not restrictive, and the intention is not to be limited to the details given herein.

An embodiment of the present invention shows the essence of any method or device used in a router described in embodiments 1 to 11.

Figure 19:
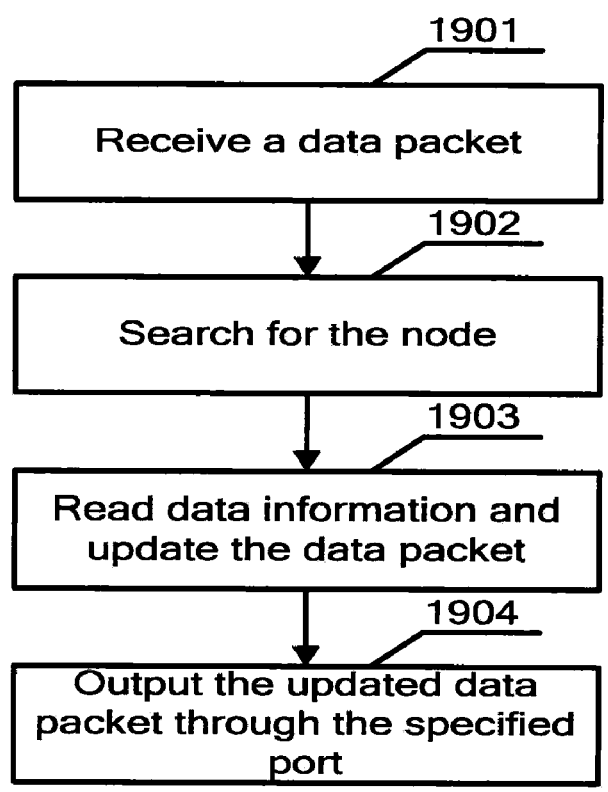
FIG. 19 is a flowchart of a method for searching for data in tree-based data structure according to another embodiment of the present invention.

As shown in FIG. 19, a method for searching for the data to be searched in a tree-based data structure according to an embodiment of the present invention is provided, including:

1901: A router receives a data packet;

The data packet can be any packet that is input through any physical input port of the router.

1902: The router searches in a primary tree or secondary tree for the node whose key value is the same as the key value of the data carried in the data packet; the primary and second trees can be stored in the memory of the router.

For the search method of 1902, reference can be made to the embodiment 2. The packet can be a Layer 2 Forwarding packet and the key value can be represented by a MAC address or a combination of a MAC address and VLAN information.

1903: The router reads the data information about the node that is found, and then updates the data information to the packet.

1904: The router outputs the updated data packet through the port that is indicated by the data information of the found node.

Figure 20:
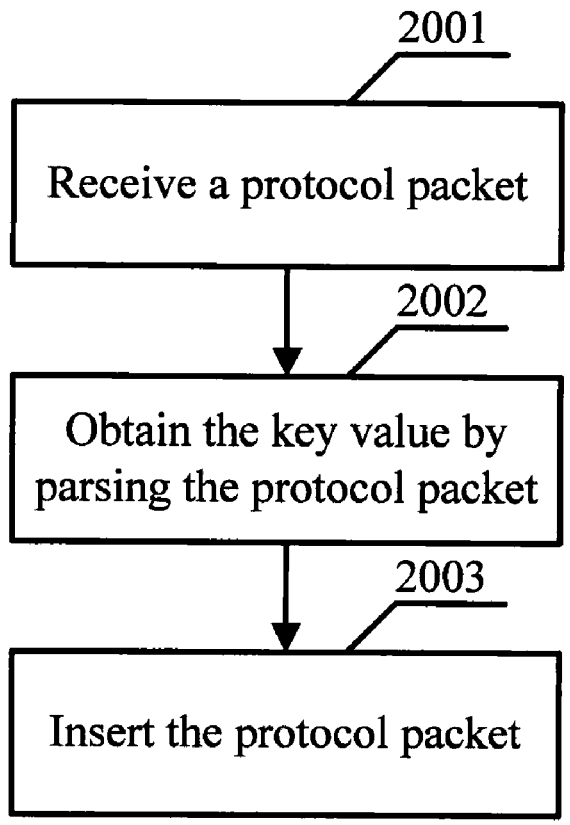
FIG. 20 is a flowchart of a method for updating data in tree-based data structure according to another embodiment of the present invention.

As shown in FIG. 20, a method for updating the data in a tree-based data structure according to an embodiment of the present invention is provided, including:

2001: A router receives a protocol packet through its port, and then forwards the protocol packet to the CPU.

2002: The CPU obtains the key value of the packet, for example, by parsing the protocol packet.

2003: The CPU sends an insertion instruction to the FPGA to instruct the FPGA to insert the protocol packet with the key value into a primary or secondary tree. For the insertion method, reference can be made to embodiment 1.

The protocol packet may be an Address Resolution Protocol (ARP) entry. Alternatively, the protocol packet may be of other types. The present invention is not limited by the description set out above.

Figure 21:
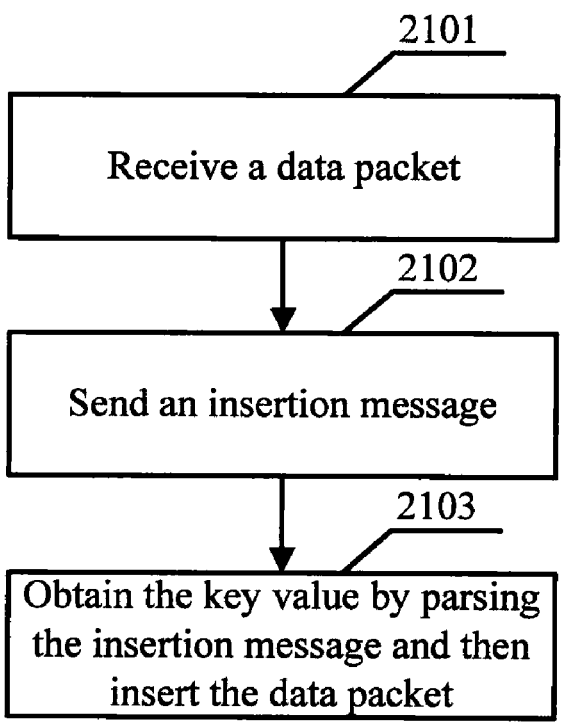
FIG. 21 is a flowchart of another method for updating data in tree-based data structure according to another embodiment of the present invention.

As shown in FIG. 21, a method for updating data in a tree-based data structure according to an embodiment of the present invention is provided, including:

2101: A router receives a data packet through its port.

2102: The router sends an insertion message to the CPU according to the instruction or the input port information carried by the data packet, where the insertion message includes the key value of the data packet.

2103: The CPU obtains the key value by parsing the insertion message, and then sends an insertion command to instruct the FPGA to insert the data packet with the key value into a primary or secondary tree. For the insertion method, reference can be made to embodiment 1.

The data packet may be a MAC entry. Additionally, the protocol packet can be of other types. The present is not limited by the description set out above. The insertion message indicates that the data need to be inserted into a primary or secondary tree.

In the above embodiment, the router implements the insertion of large-capacity entries by using a tree-based data structure. Because the tree-based data structure of the present invention reduces the tree height, the entry insertion speed is increased.

In the above embodiment, a tree-based data structure is divided into a primary tree and secondary trees. This reduces the tree height and the time spent on node insertion, and thus increasing the node insertion speed. As the tree height is reduced, the node to be searched or the node to be deleted can be found more quickly, thus increasing the node searching speed and node deletion speed. Balancing the primary tree may reduce the height of the primary tree, and thus the height of the entire tree-based data structure is reduced. Therefore, the speed of node insertion, node searching and node deletion is increased. Additionally, merging secondary trees releases memory resources, thus increasing available memory space.

Those skilled in the art may understand that all or part of the steps in the preceding embodiments may be performed on hardware by following instructions of a program. The program may be stored in a computer readable-memory medium such as a RAM, a memory, a Read-Only Memory (ROM), an Electrically-Programmable Read-Only Memory (EPROM), an Electrically-Erasable Programmable Read-Only Memory (EEPROM), a register, a hard disk, a removable disk, a CD-ROM, or a memory media of any forms that is well-known to persons skilled in the art.

Detailed above are a tree-based node insertion method and a memory device provided in the embodiments of the present invention. Although the principles and implementation schemes of the invention are described through some exemplary embodiments, the invention is not limited to such embodiments. It is apparent that those skilled in the art can make various modifications and variations to the invention without departing from the scope of the invention. The invention shall cover the modifications and variations provided that they fall in the scope of protection defined by the following claims or their equivalents.

What is claimed is:

1. A tree-based node insertion method, comprising:
    searching, by a memory device, in a primary tree, for a first nearest node according to a key value of a node to be inserted, wherein:
        a key value of the first nearest node is smaller than and most approximate to the key value of the node to be inserted,
        a key value of a root node of the primary tree is initialized to a minimum key value, and
        a key value of a left child node is greater than a key value of a parent node, the key value of the parent node is greater than a key value of a right child node, and the left child node and right child node belong to the parent node in the primary tree;
    specifying, by a memory device, a secondary tree, to which an external pointer of the first nearest node points, as a current secondary tree, and determining whether the current secondary tree is full,
    if the current secondary tree is full:
        selecting a node from the current secondary tree as a split node,
        inserting the split node into the primary tree as a new node,
        assigning a new secondary tree to the new node,
        pointing an external pointer of the new node to the new secondary tree,
        transferring nodes on the left of the split node to the new secondary tree, and
        searching for the first nearest node in the primary tree,
    if the current secondary tree is not full, inserting the node to be inserted into the current secondary tree.

2. The method according to claim 1, wherein searching in the primary tree for the first nearest node according to the key value of the node to be inserted and specifying the secondary tree to which the external pointer of the first nearest node points as the current secondary tree comprise:
    reading an external pointer of the root node, setting a variant as the external pointer of the root node, and specifying the root node as a current node;
    judging whether the key value of the node to be inserted is greater than a key value of the current node, and if the key value of the node to be inserted is greater than the key value of the current node, setting the variant as an external pointer that points to a left child node of the current node, and specifying the left child node as the current node, and if the key value of the node to be inserted is not greater than the key value of the current node, specifying a right child node of the current node as the current node;
    judging whether the current node is a leaf node, and if the current node is a leaf node, specifying a secondary tree to which the variant points as the current secondary tree.

3. The method according to claim 2, further comprising:
    judging whether the current node is empty or invalid, and if the current node is empty or invalid, specifying a secondary tree to which the variant points as the current secondary tree.

4. The method according to claim 1, further comprising a balance operation on the primary tree, wherein the balance operation on the primary tree comprises:
    performing the balance operation on the primary tree when the nodes at a layer except a bottom layer in the primary tree are in a non-empty state; or
    performing the balance operation on the primary tree when the number of empty nodes at all the layers except at the bottom layer reaches a specified value.

5. The method according to claim 1, wherein determining whether the current secondary tree is full comprises:
    determining whether a usage of the current secondary tree reaches a specified usage, and if the usage of the current secondary tree reaches the specified usage, the current secondary tree is full, and if the usage of the current secondary tree does not reach the specified usage, the current secondary tree is not full.

6. The method according to claim 1, before searching the primary tree for the first nearest node according to the key value of the node to be inserted, further comprising:
    receiving a packet through an input port of a router and obtaining the key value of the packet;
    inserting the node to be inserted into the current primary tree comprising:
        inserting the packet with the key value into the current secondary tree.

7. The method according to claim 1, further comprising:
   searching in the primary tree for a node to be searched according to a key value of the node to be searched, and if the node to be searched does not exist in the primary tree, searching for the second nearest node in the primary tree; a key value of the second nearest node is smaller than and the most approximate to the key value of the node to be searched;
   specifying a secondary tree to which an external pointer of the second nearest node points as the current secondary tree;
   searching in the current secondary tree for the node to be searched.

8. The method according to claim 7, before searching in the primary tree for the node to be searched according to the key value of the node to be searched, further comprising:
   receiving a data packet through an input port of a router and obtaining the key value of the node to be searched from the data packet;
   after searching in the current secondary tree for the node to be searched, further comprising:
   reading data information about the node that is found, and updating the data information to the data packet; outputting the updated data packet through a port that is indicated by the data information.

9. The method according to claim 1, further comprising:
   searching in the primary tree for a node to be deleted according to a key value of the node to be deleted, and if the node to be deleted does not exist in the primary tree, searching for the third nearest node in the primary tree, where a key value of the third nearest node is smaller than and the most approximate to the key value of the node to be deleted;
   specifying a secondary tree to which an external pointer of the third nearest node points as the current secondary tree;
   searching in the current secondary tree for the node to be deleted;
   deleting the node that is found.

10. The method according to claim 9, after deleting the node to be deleted, further comprising:
    when the number of valid nodes in the secondary trees to which a first positive integer number of adjacent nodes in the primary tree point is smaller than the number of nodes that can be accommodated in a second positive integer number of secondary trees, and the first positive integer number is greater than the second positive integer number:
    merging the first positive integer number of adjacent nodes and secondary trees to which the first positive integer number of adjacent nodes point, into a second positive integer number of nodes of the primary tree and secondary trees to which the second positive integer number of nodes of the primary tree point.

11. The method according to claim 10, wherein the condition that the number of valid nodes in the secondary trees, to which a first positive integer number of adjacent nodes in the primary tree point, is smaller than the number of nodes that can be accommodated in a second positive integer number of secondary trees further comprises:
    the number of valid nodes in the secondary trees, to which two adjacent nodes in the primary tree point, is smaller than the number of nodes that can be accommodated in a secondary tree;
    merging the first positive integer number of adjacent nodes and the secondary trees to which the first positive integer number of adjacent nodes point, into the second positive integer number of nodes of the primary tree and the secondary trees to which the second positive integer number of nodes of the primary tree point, further comprising:
    inserting the node that has a greater key value in the two adjacent nodes and valid nodes of a secondary tree to which the node that has a greater key value points, into the secondary tree to which the node that has a smaller key value points.

12. A tree-based node insertion method, comprising:
    searching, by a memory device, in a primary tree, for a nearest node according to a key value of a node to be inserted, wherein:
      a key value of the nearest node is greater than and most approximate to the key value of the node to be inserted,
      a key value of a root node of the primary tree is initialized to a maximum key value, and
      a key value of a left child node is greater than a key value of a parent node, the key value of the parent node is greater than a key value of a right child node, and the left child node and right child node belong to the parent node in the primary tree;
    specifying, by a memory device, a secondary tree, to which an external pointer of the nearest node points, as a current secondary tree, and determining whether the current secondary tree is full,
    if the current secondary tree is full:
      selecting a node from the current secondary tree as a split node,
      inserting the split node into the primary tree as a new node,
      assigning a new secondary tree to the new node,
      pointing an external pointer of the new node to the new secondary tree,
      transferring nodes on the left of the split node to the new secondary tree, and
      searching for the first nearest node in the primary tree;
    if the current tree is not full, inserting the node to be inserted into the current secondary tree.

13. A memory device, comprising:
    a secondary tree memory unit, configured to store a secondary tree;
    a primary tree memory unit, configured to store a primary tree that has a node with an external pointer pointing to the secondary tree;
    a search unit, configured to search in a primary tree for the first nearest node according to a key value of a node to be inserted, wherein:
      a key value of the first nearest node is smaller than and most approximate to the key value of the node to be inserted,
      a key value of a root node of the primary tree is initialized to a minimum key value, and
      a key value of a left child node is greater than a key value of a parent node, the key value of the parent node is greater than a key value of a right child node, and the left child node and right child node belong to the parent node in the primary tree;
    a judgment unit, configured to:
      specify a secondary tree, to which an external pointer of the first nearest node points, as a current secondary tree, and
      judge whether the current secondary tree is full;

a transfer unit, configured to, when the judgment unit determines that the current secondary tree is full:
select a node from the current secondary tree as a split node,
insert the split node into the primary tree as a new node,
assign a new secondary tree to the new node,
point an external pointer of the new node to the new secondary tree, and
transfer nodes on the left of the split node to the new secondary tree; and
an insertion unit, configured to, when the judgment unit judges that the current secondary tree is not full, insert the node to be inserted into the current secondary tree.

14. The memory device according to claim 13, further comprising:
a first search unit, configured to:
search in the primary tree for a node to be searched according to a key value of the node to be searched, and
if the node to be searched does not exist in the primary tree, search for the second nearest node in the primary tree, wherein a key value of the second nearest node is smaller than and most approximate to the key value of the node to be searched; and
a to-be-searched node search unit, configured to:
specify a secondary tree to which an external pointer of the second nearest node points as the current secondary tree, and
search in the current secondary tree for the node to be searched.

15. The memory device according to claim 13, further comprising:
a second search unit, configured to:
search in the primary tree for a node to be deleted according to a key value of the node to be deleted, and
if the node to be deleted does not exist in the primary tree, search for the third nearest node in the primary tree, wherein a key value of the third nearest node is smaller than and most approximate to the key value of the node to be deleted;
a to-be-deleted node search unit, configured to:
specify a secondary tree to which an external pointer of the third nearest node points as the current secondary tree, and
search in the current secondary tree for the node to be deleted; and
a deletion unit, configured to delete the node that is found.

16. The memory device according to claim 13, further comprising:
a detection unit, configured to detect whether the number of valid nodes in the secondary trees, to which a first positive integer number of adjacent nodes in the primary tree point, is smaller than the number of nodes that can be accommodated in a second positive integer number of secondary trees, wherein the first positive integer number is greater than the second positive integer number;
a merging unit, configured to, when the detection result is YES, merge the first positive integer number of adjacent nodes and the secondary trees, to which the first positive integer number of adjacent nodes point, into a second positive integer number of nodes of the primary tree and secondary trees to which the second positive integer number of nodes of the primary tree point.

* * * * *

UNITED STATES PATENT AND TRADEMARK OFFICE
CERTIFICATE OF CORRECTION

PATENT NO. : 8,208,408 B2
APPLICATION NO. : 12/732693
DATED : June 26, 2012
INVENTOR(S) : Wenhua Du, Rongfeng Hong and Yi Yi Page 1 of 1

It is certified that error appears in the above-identified patent and that said Letters Patent is hereby corrected as shown below:

In claim 12, column 18, line 38, "left" should read as -- right --

Signed and Sealed this
Ninth Day of April, 2013

Teresa Stanek Rea
*Acting Director of the United States Patent and Trademark Office*